United States Patent [19]

James et al.

[11] Patent Number: 5,044,194

[45] Date of Patent: Sep. 3, 1991

[54] MISFIRE DETECTION IN AN INTERNAL COMBUSTION ENGINE

[75] Inventors: John V. James, Walled Lake; James M. Dosdall, Grosse Ile; Kenneth A. Marko, Ann Arbor, all of Mich.

[73] Assignee: Ford Motor Company, Dearborn, Mich.

[21] Appl. No.: 650,102

[22] Filed: Feb. 4, 1991

Related U.S. Application Data

[62] Division of Ser. No. 572,650, Aug. 24, 1990.

[51] Int. Cl.$^5$ .......................................... G01M 15/00
[52] U.S. Cl. .................................................... 73/112
[58] Field of Search ....................... 73/117.3, 112, 116

[56] References Cited

U.S. PATENT DOCUMENTS 4,179,922 12/1979 Bouveric ............................... 73/116
4,301,678 11/1981 Full et al. ............................... 73/116

Primary Examiner—Robert Raevis
Attorney, Agent, or Firm—Mark Mollon; Roger L. May

[57] ABSTRACT

A method and apparatus are provided for reliably detecting misfires in an internal combustion engine during actual driving conditions by monitoring fluctuations in engine speed between consecutive firing intervals. An average acceleration over a series of firing intervals is removed from an individual acceleration measurement corresponding to a particular firing interval to five an acceleration deviation which is then normalized to an expected torque to provide a power loss measurement. The power loss measurement indicates the occurrence of a misfire with a high signal-to-noise ratio. The information derived from misfire detection can be used to prevent destruction of a catalytic converter by unburned fuel mixtures and can be used to improve vehicle driveability by correcting for or indicating needed sevice for the vehicle. The misfire detection is implemented using existing sensors and processors and is adapted to be done on-board a vehicle in real time.

1 Claim, 5 Drawing Sheets

MISFIRE DETECTION IN AN INTERNAL COMBUSTION ENGINE

This is a division of application Ser. No. 07/572,650, filed Aug. 24, 1990.

BACKGROUND OF THE INVENTION

The present invention relates in general to detecting misfires occurring during normal in-use vehicle operation of internal combustion engines, and more specifically to measuring power loss during each particular cylinder firing to identify the occurrence of misfires.

Most automobiles employ a catalytic converter to reduce the amount of pollutants in the engine exhaust. However, when a cylinder misfires so that no or incomplete combustion occurs, uncombusted fuel is introduced into the exhaust which burns in the hot catalytic converter. The heat from fuel burning in the catalytic converter destroys the catalyst. Thus, it becomes desirable to detect and count engine misfires and signal the operator of the vehicle upon occurrence of excessive misfires so that steps may be taken to protect the catalytic converter.

It is also desirable to detect misfires in order to allow adaptive control of the combustion engine in order to improve engine performance or to possibly eliminate the condition leading to misfire or remove fuel to the misfiring cylinder and thereby protecting the catalyst.

The identity of a misfiring cylinder and the frequency of misfires can be recorded for later use during diagnosis and repair of the vehicle.

Gas pressure from combustion in a properly firing cylinder accelerates the engine crankshaft during the power stroke of that particular cylinder. If a cylinder misfires instead of properly firing, then friction, compression occurring in other cylinders, and the presence of an external engine load combine to produce a net deceleration during the power stroke. The actual deceleration is normally small since engines are intentionally provided with a flywheel having large inertial mass to allow smooth operation in spite of the periodic power stroke pulsations and random fluctuations in power.

Decelerations are also caused by load and torque variations during vehicle operation. During other driving conditions, it may also be normal for no significant power to be produced by a particular cylinder firing, such as during a closed throttle deceleration. As a result of these difficulties, prior art attempts to detect misfires through crankshaft acceleration computed from crankshaft velocity measurements has met with limited success.

In Hanson et al, U.S. Pat. No. 3,972,230, it is shown that a misfire results in an abrupt reduction in instantaneous speed during the power period in which the misfire occurs. An engine is operated an idle speed and velocity measurements for about 200 consecutive power periods are collected. An average deceleration rate is found for each cylinder and individual deceleration rates are compared to the cylinder average deceleration rate to detect individual misfires. However, this method works only at idle speed and even then it requires averaging over many engine cycles in order to identify a misfiring cylinder because the technique has a poor signal-to-noise performance.

In Citron et al, U.S. Pat. No. 4,532,592, the change in instantaneous engine speed between successive cylinders provides a basis for determining the relative combustion efficiency of each cylinder. An index of performance is calculated based on crankshaft rotational time intervals which are digitally filtered. In order to get an accurate measure of the relative torque produced by a given cylinder, the index of performance is averaged over several successive firings. Furthermore, the method disclosed in this patent assumes that an engine is operating at steady-state so that the sum of individual performance indices over an integral number of engine cycles will tend to zero. Therefore, the method described in this patent is incapable of accurate misfire detection during nonsteady-state (i.e., transient) operation of an engine which constitutes the majority of normal driving conditions.

Accordingly, it is a principal object of the present invention to provide a method and apparatus for detecting misfires in an internal combustion engine.

It is a further object of this invention to detect misfires based on readily available engine operating data using sensors which are typically already present within an engine for other purposes.

It is another object of this invention to detect engine operating conditions which could cause damage to a catalytic converter.

It is still another object of this invention to prevent damage to a catalytic converter.

It is a further object of this invention to improved drivability of a vehicle by responding to the occurrence of misfires in order to reduce or eliminate further misfires.

It is yet another object of this invention to detect the occurrence of misfires over a full range of speed and load of an internal combustion engine, either during steady-state operation or transient operation.

It is a further object of this invention to detect misfires in real-time on board a moving vehicle, the misfire detection achieving extremely low error rates.

SUMMARY OF THE INVENTION

These and other objects are achieved according to the present invention wherein a parameter related to acceleration of an individual power stroke during engine combustion is normalized to an estimate of the engine torque that would be expected if the engine was operating without any misfires. The normalized acceleration provides a percent power loss for a corresponding cylinder or power stroke which is compared to a predetermined threshold to determine whether a particular firing event resulted in a misfire. Preferably, the estimated engine torque must be above a predetermined torque (which may be RPM dependent) in order for the comparison of normalized acceleration to be valid. Thus, estimated engine torque must be above the predetermined torque in order to signal the occurrence of a misfire.

In four-stroke engines having more than four cylinders, power strokes overlap. For example, in a six-cylinder engine the top dead center (TDC) of successive cylinders are 120° of engine rotation apart. The rotation interval between TDC's will be referred to as the firing interval of the cylinder at TDC at the beginning of the interval, although the actual spark for that cylinder may occur before top dead center. Thus, acceleration measurements are made once per firing interval so that the number of measurements during each engine cycle equals the number of cylinders in the engine. In a four-cylinder engine the firing interval corresponds to the power stroke.

The present invention removes effects on the acceleration measurements caused by transient operation accelerations and decelerations by removing an average engine acceleration using a median filter over a series of firing intervals substantially centered on a selected firing interval for which misfire detection is being performed.

The detected misfires can be counted and stored for further analysis or for indicating a warning to an operator of a vehicle when excessive misfires occur. If a particular cylinder continues to misfire, fuel flow may be stopped to that cylinder.

The present invention further detects load variations applied to the engine which cause contributions to the acceleration measurement. For example, road bumps may apply a torque to the drivetrain which is transmitted to the engine crankshaft. The load variation information can be used to correct the acceleration measurements or to indicate an invalid testing condition for detecting a misfire. The load variation may be detected by sensing rapid changes in the height of the vehicle suspension.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

DETAILED DESCRIPTION OF PREFERRED EMBODIMENTS

Figure 1:
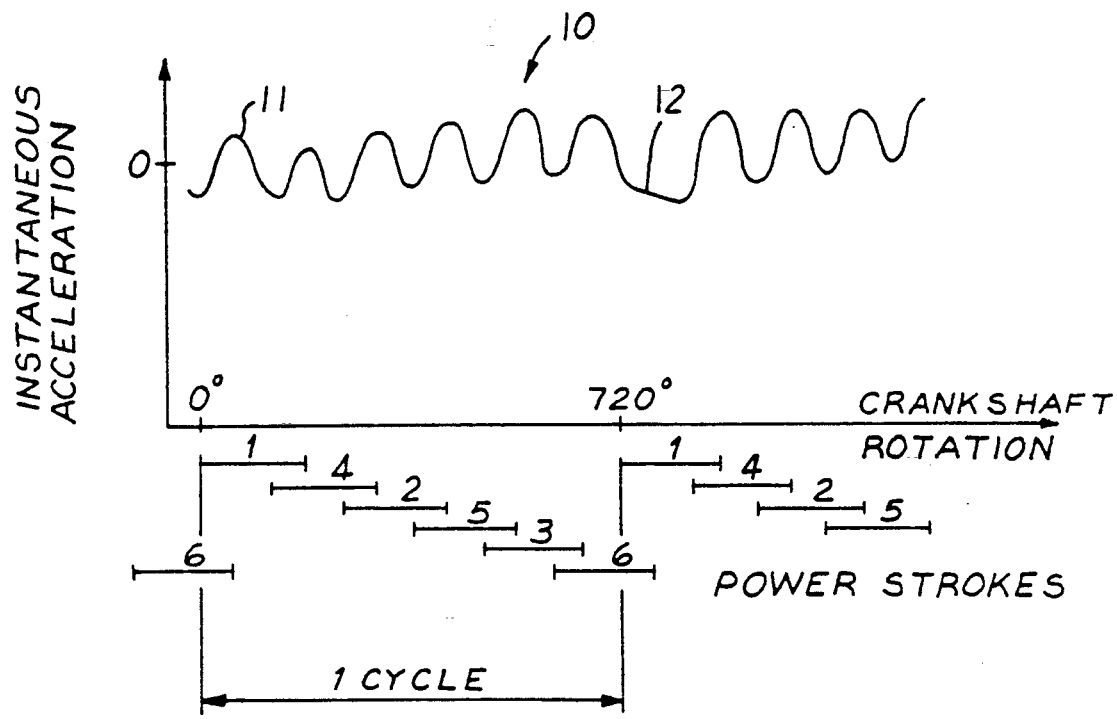
FIG. 1 is a plot showing instantaneous acceleration versus crankshaft rotation for normal and misfiring cylinders.

In the typical four-stroke combustion engine, the four strokes include the intake stroke, the compression stroke, the power stroke, and the exhaust stroke. As shown in FIG. 1, the power strokes of the respective cylinders are arranged in a particular order according to crankshaft position. Furthermore, in any engine having more than four cylinders, the power strokes of different cylinders will overlap. One engine cycle is comprised of 720° of crankshaft rotation during which each cylinder passes through each of its four strokes.

Curve 10 in FIG. 1 shows approximate acceleration fluctuation during engine operation. An acceleration peak 11 occurs during the firing interval of cylinder No. 1 and other maximums in the acceleration curve occur approximately corresponding to each other properly firing cylinder. Thus, although power strokes overlap, their individual effects are at least partially separable into distinct acceleration fluctuations.

When a misfire occurs such that no significant power is created by a cylinder during its firing interval, the crankshaft decelerates as indicated at 12. The deceleration continues at least during the time that the misfiring cylinder is the only cylinder in its power stroke.

Figure 2:
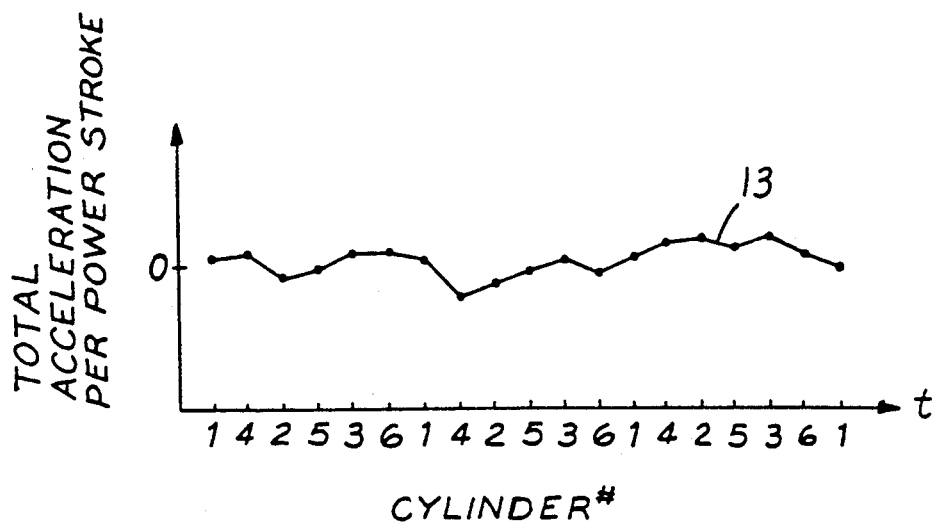
FIG. 2 is a plot showing typical total acceleration per firing interval versus cylinder number for an operating engine.

The accuracy required to measure angular rotation and time to derive the resolution shown in FIG. 1 is not feasible or desirable in on-board automotive systems. Rather, approximately one velocity measurement per firing interval is taken and the difference between successive velocities is calculated to determine one total acceleration measurement per cylinder. Such acceleration calculations are plotted in FIG. 2. Curve 13 shows the variation which can be measured in the total acceleration between firing intervals of successive cylinders in the firing order of the combustion engine. Unfortunately, the curve shown in FIG. 2 has not proven to be a reliable indicator of misfires. Difficulties arise in attempting to separate acceleration fluctuations due to misfires from fluctuations caused by engine transients such as changes in vehicle speed or load. Even when transients are artificially removed by requiring engine operation at idle speed, prior art systems have lacked sufficient accuracy or have not properly isolated the effects of one cylinder firing interval from the adjacent firing intervals to allow any accurate detection of misfires.

The present invention provides a method for detecting cylinder misfires in a reliable way with extremely low error rates. According to the inventive method, the contribution to engine power of each cylinder is isolated from the effects of engine transients and the neighboring cylinders by subtracting an average acceleration over a series of surrounding cylinder firings from the acceleration calculated for the particular firing interval of interest. This removes the longer term acceleration effects which result from throttle and load variations. The acceleration average is preferably a median average to provide the best transient performance. However, a mean average can be used to reduce the computation required.

To maintain uniform sensitivity of misfire detection over all levels of engine speed and load, the acceleration deviation is normalized to a measure of expected torque before being subjected to a threshold for discriminating between misfires and proper firings. Expected torque is the amount of indicated torque that would be expected to be produced by a properly firing cylinder and can be calculated from such engine parameters as manifold pressure, throttle opening, air flow, fuel flow, spark advance, EGR fraction, or engine velocity.

The normalized acceleration is equivalent to the percent of power loss exhibited by one cylinder firing relative to the average torque that is expected based on the engine operation. A histogram of the measured power loss from a running engine is strongly bimodal, with histogram peaks representing full engine power output and no output (i.e., misfire).

During some conditions, such as closed throttle decelerations or sudden throttle transients, it is normal for each individual cylinder firing to produce no significant power. Therefore, when such conditions are detected, the power loss test is suspended.

Figure 3:
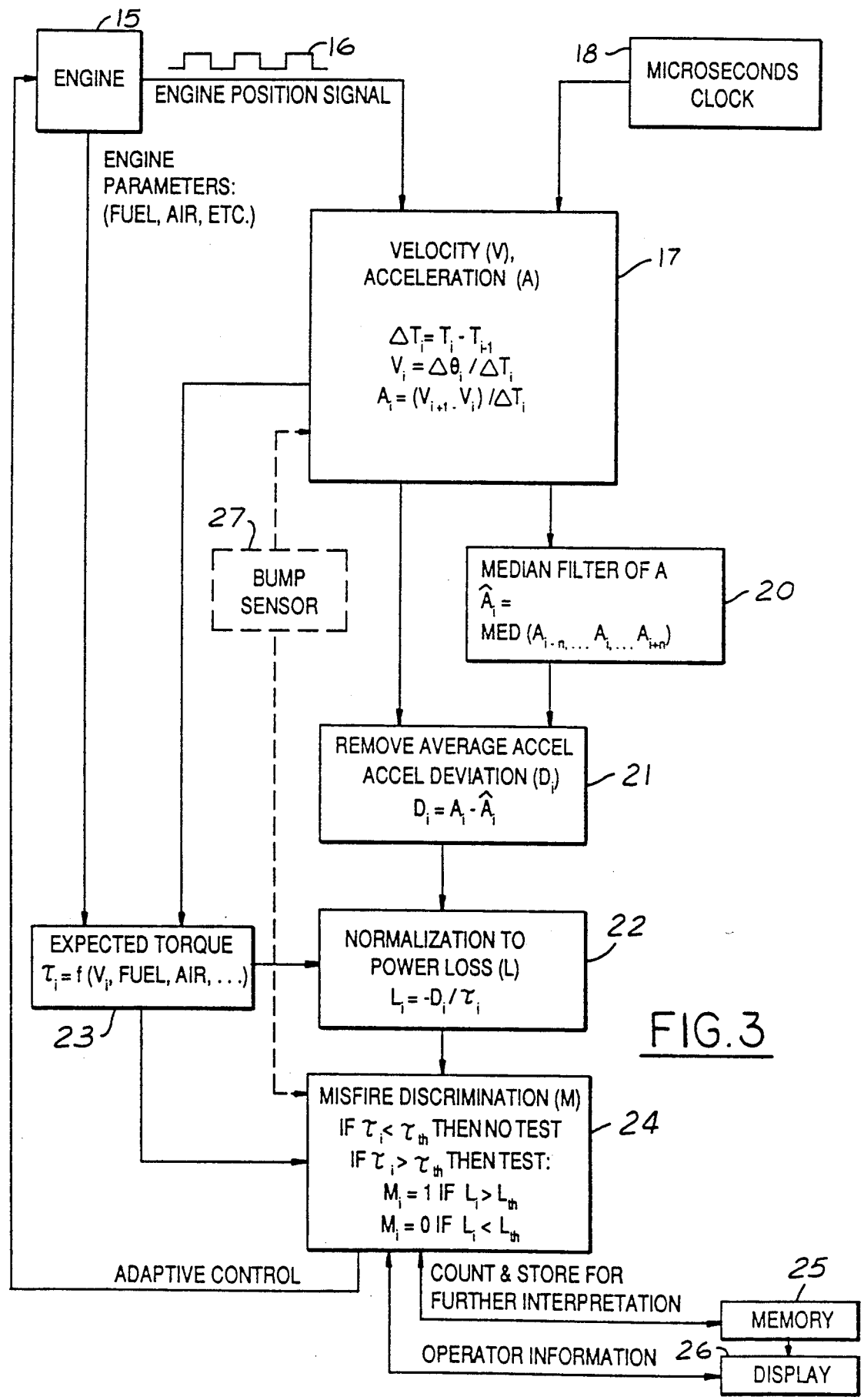
FIG. 3 is a block diagram showing the misfire detection of the present invention.

Turning now to FIG. 3, the present invention is shown in greater detail. An engine 15 provides engine position signals 16 at predetermined rotational positions. Engine position signals 16 are provided to an acceleration block 17 which also receives clock signals from a clock 18 used to calculate velocity $V_i$ and acceleration $A_i$ for each firing interval i. For example, where each engine position pulse in engine position signal 16 is in predetermined relation with the beginning of a respective top dead center, then an elapsed time $\Delta T_i$ for an i'th firing interval is determined by the passage of time between the i'th position pulse and the i+1 position pulse (usually determined from pulse rising edge to rising edge). The velocity $V_i$ over firing interval i equals the angular rotation between rising edges divided by the time elapsed between their respective passage past a fixed point. Acceleration $A_i$ for firing interval i equals the immediately following velocity measurement $V_{i+1}$ minus the respective velocity $V_i$ divided by elapsed time period $\Delta T_i$. A preferred method for velocity and acceleration measurement is disclosed in copending application Ser. No. 572,282 filed on the same date as the present application, which is incorporated herein by reference in its entirety. All of the calculations shown in FIG. 3 are preferably performed in an on-board microcomputer such as an electronic engine control (EEC) which is connected to various sensors and actuators within the engine.

The acceleration measurements $A_i$ are provided by acceleration block 17 to an averaging block 20. The $A_i$ measurements are preferably provided continuously or in large groups for processing. A series of acceleration measurements $A_{i-n}$ to $A_{i+n}$ are median averaged in order to determine the gross acceleration of the engine.

A difference block 21 receives the $A_i$ measurements from acceleration block 17 and the average accelerations $\hat{A}_i$ about each individual acceleration from averaging block 20. The difference between an individual acceleration and the average acceleration centered on that individual acceleration measurement provides an acceleration deviation $D_i$ which is an indication of the power contribution of i'th cylinder with engine transient effects removed. The acceleration deviation $D_i$ is provided to a normalization block 22.

A torque calculator 23 is connected to engine 15 for sensing various engine parameters according to any convenient engine model for estimating engine torque based on the sensed engine parameters. The engine model for relating the sensed parameters to indicated torque provided by the engine can be empirically measured by operating a vehicle on a dynamometer, for example. Thus, an engine could be operated at various air charges and RPMs to create a mapping of these variables to indicated torque as measured by the dynamometer. The map can b e stored in a lookup table in the engine microcomputer. During vehicle operation, the air charge and RPM are measured and the torque values from the lookup table are retrieved. The microcomputer can interpolate between values if the measured variables are between the values used during dynamometer measurements. Various offsets may also be employed according to other engine parameters as is known in the art.

Torque calculator 23 is also shown as being connected to acceleration block 17 since engine speed is a likely engine parameter for determining the expected torque to be delivered by engine 15. Expected torque is more slowly varying than engine acceleration measurements and therefore need not be updated at the frequency of every firing interval, although it may be best to do so.

The expected torque calculated in block 23 is provided to normalization block 22 and to a discriminator and analyzer 24. Normalization block 22 computes a power loss $L_i$ by dividing the negative acceleration deviation $-D_i$ by expected torque $\tau_i$. Power loss $L_i$ is provided to discriminator and analyzer 24 which performs two comparisons, in the preferred embodiment. In the first comparison, expected torque $\tau_i$ is compared to a torque threshold $\tau_{th}$. If the calculated expected torque is at least greater than a torque threshold, then discriminator and analyzer 24 performs a second comparison to separate misfires from normal firings. Thus, a digital value $M_i$ equals 1 to indicate that a misfire has occurred if power loss $L_i$ is greater than a power loss threshold $L_{th}$ and is assigned a value of zero when power loss is less than the power loss threshold.

The first comparison of expected torque versus a torque threshold prevents the second test from being performed when no significant power is being produced by engine 15. Torque threshold $\tau_{th}$ represents an amount of torque which is very small since even when engine 15 is at idle it is providing sufficient torque to enable a positive test for misfire. The value of expected torque $\tau_i$ will normally fall below the torque threshold only during closed throttle decelerations.

Figure 4:
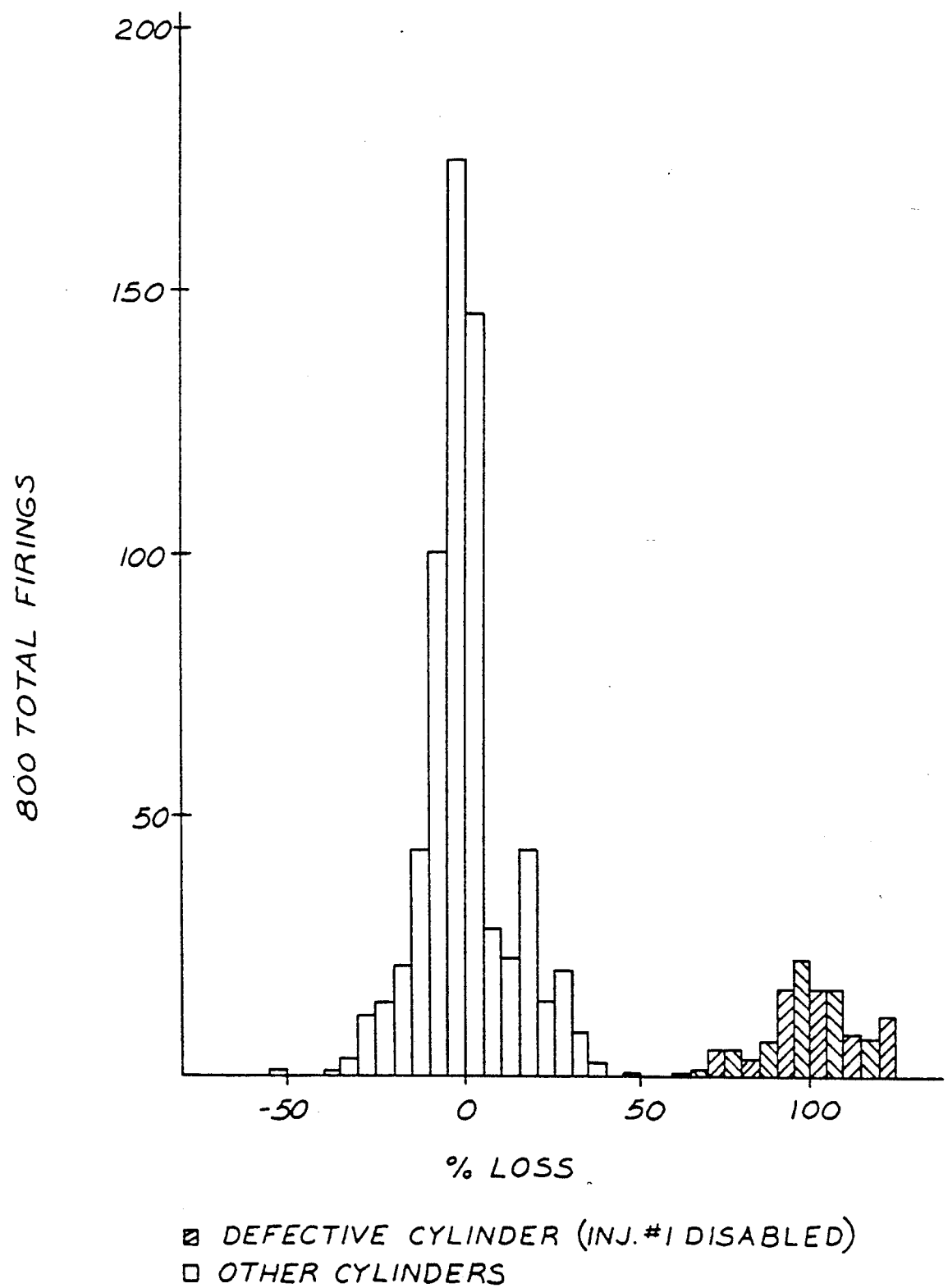
FIG. 4 is a histogram showing power loss measurements in an engine deliberately operated with a defective cylinder.

As shown in FIG. 4, the values for power loss $L_i$ are very strongly bimodal in that the values corresponding to the misfiring defective cylinder fall solely within one region of the histogram while values corresponding to all normally firing cylinders are contained within a separate area of the histogram. Thus, a power loss threshold $L_{th}$ is selected so that it falls between the separate regions in the histogram, e.g., at 50% power loss. The power loss threshold can also be adjusted upward or downward if it is desired to be more conservative or more liberal in calling a low power firing a misfire.

Returning to FIG. 3, misfire data $M_i$ is provided to a memory 25 for later recall. The misfire data is also analyzed in discriminator and analyzer 24 in order to energize a display 26 or to provide adaptive control to engine 15 if desired.

Figure 5:
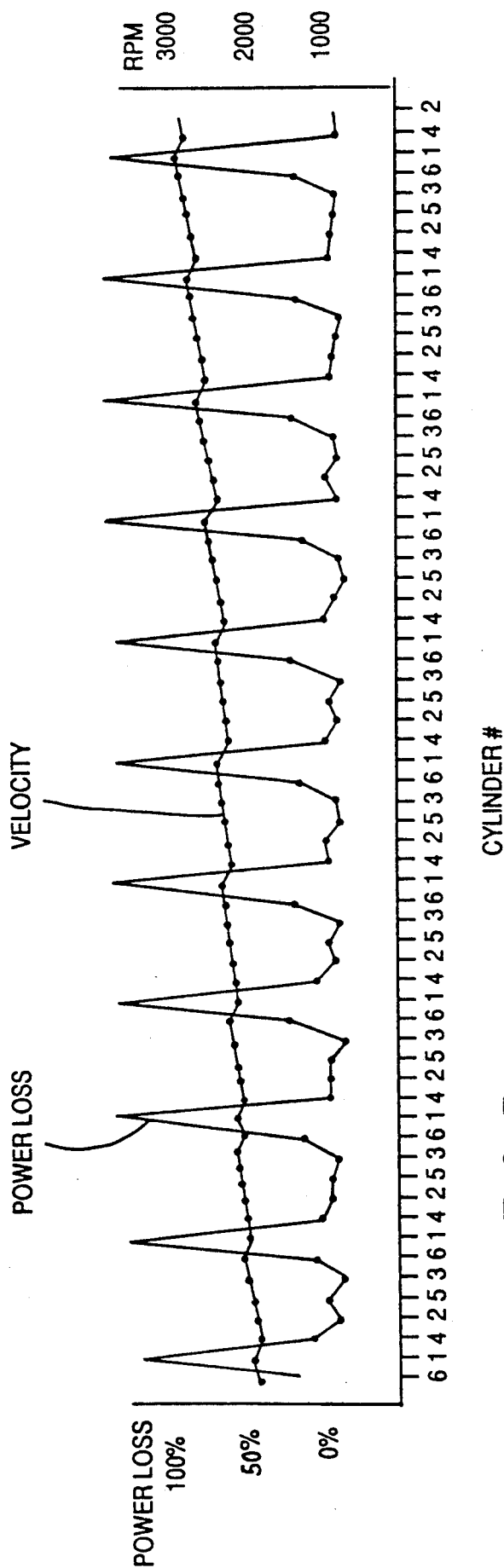
FIG. 5 is a plot showing power loss and engine speed for the same engine test as shown in FIG. 4.

FIG. 5 plots power loss and velocity during running of an engine operated with misfires deliberately introduced in cylinder No. 1. The plot of velocity shows a slight drop following the measurement corresponding to cylinder No. 1. It is clearly very difficult to identify misfiring cylinders based on velocity or just velocity differences (i.e., signal-to-noise in the measurement is low), especially when an engine is operating at high speed or accelerations. In contrast, the power loss plot provides a good separation between those cylinder firings which occur normally and those which correspond to a misfire (i.e., there is a high signal-to-noise ratio).

Figure 6A:
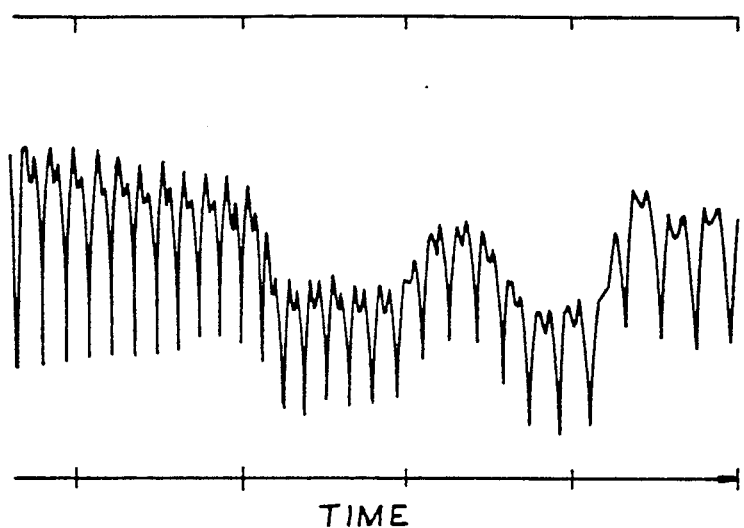
FIG. 6A is a plot of successive cylinder acceleration measurements during an engine transient.
Figure 6B:
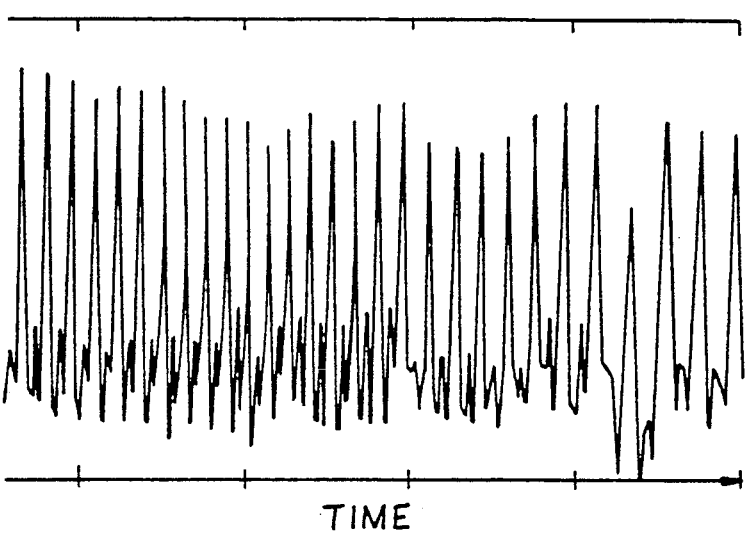
FIG. 6B is a plow or power loss during the transient of FIG. 6A.

Power loss calculation as a basis for detecting misfires is highly advantageous over similar attempts using acceleration calculation. FIG. 6A shows a plot of crankshaft acceleration during an engine transient. The baseline and the relative magnitude of the acceleration very widely throughout the transient making it impossible to distinguish firing and misfiring cylinders by merely applying an acceleration threshold to the calculated acceleration. FIG. 6B plots power loss during the same engine transient shown in FIG. 6A. The power loss curve maintains substantially constant baseline and relative magnitudes during the engine transient. Misfiring cylinders can be distinguished from properly firing cylinders by application of a single threshold throughout the entire engine transient.

Returning to FIG. 3, misfire discriminator and analyzer 24 preferably processes the misfire data $M_i$ over many consecutive values for variable i so that variable $M_i$ can be examined for patterns indicative of particular engine operating faults such as a bad fuel injector or defective spark plug, for example. Thus, predetermined characteristics in the misfire data can be detected as a particular pattern and an appropriate response for the particular engine operating fault can be initiated.

The simplest pattern to appear in the misfire data would be the repeated misfiring of an individual cylinder on each of its successive firing intervals. The presence of misfires means that uncombusted fuel is being passed to the catalytic converter where it will burn, thereby increasing the temperature in the catalytic converter and leading to its destruction. In order to protect the catalytic converter, fuel supplied to the particular cylinder involved might be stopped if individual fuel injectors are provided for each cylinder.

Other patterns of misfiring, such as random misfires, can be correlated with other engine faults. An expert system or a pattern recognition system, such as a neural network, can be employed to relative a particular pattern of misfires and other data to a particular fault condition.

As shown in FIG. 3, a memory 25 can be employed to store the misfire data. Preferably, an electronically erasable programmable read-only memory (EEPROM) is employed for memory 25 so that misfire data is retained in memory 25 indefinitely for retrieval during vehicle servicing.

Display 26 is provided to notify an operator of the vehicle of a misfire condition. The operator might be notified of the occurrence of a single misfire. Preferably, the misfire data is analyzed in a manner to identify whether the misfiring of any individual cylinder occurs at greater than a predetermined frequency (i.e., ratio of misfires to total firing intervals of the particular cylinder) before activating the display.

With regard to average acceleration determined in averaging block 20 in FIG. 3, a median filtered average is preferred. In other words, the average acceleration of a series of acceleration is that value of acceleration which has an equal number of acceleration values in the series that are greater than and less than the median value.

Preferably, the series of accelerations for determining an average acceleration value $\hat{A}_i$ includes an odd number of consecutive acceleration measurements having the respective acceleration value of interest at the center. In other words, each series for the average acceleration $\hat{A}_i$ is comprised of acceleration measurements $A_{i-n}, \ldots A_i, \ldots A_{i+n}$, where n is a whole number.

Figure 7:
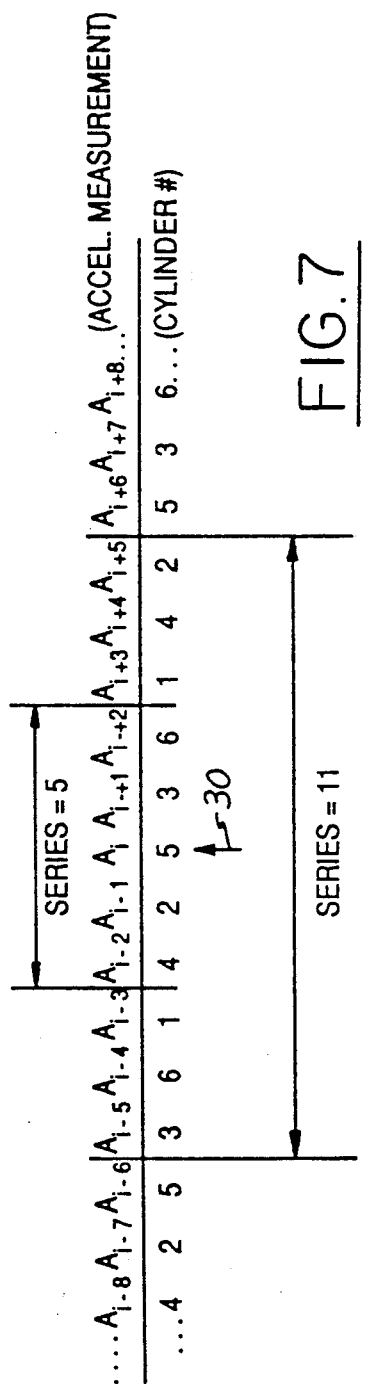
FIG. 7 shows the preferred series of acceleration measurements used in computing an average acceleration to remove engine operating transients.

If N is the number of cylinders in an internal combustion engine, the number of acceleration measurements within a series for computing an average acceleration is preferably equal to $2*N-1$. For example, as shown in FIG. 7, a preferred series of acceleration measurements for a six-cylinder engine includes 11 individual acceleration measurements since N equals 6. The i'th firing interval falling at the center of the series in FIG. 7 corresponds to cylinder No. 5 as indicated at arrow 30. The preferred series of measurements having 11 individual acceleration values centered on cylinder No. 5 includes measurements of the other cylinders No. 1-4 and 6 each twice, and only one measurement from cylinder 5 contributing to the average.

More generally, the number of acceleration measurements in a series can be equal to $x*N-1$, where x is a whole number (1,2,3, ...). Thus, when N equals 6 and x equals 1, the number of firing intervals in a series equals 5.

As mentioned above, an expected torque $\tau_i$ must be above a torque threshold $\tau_{th}$ in order to have a valid test condition. During conditions when the engine torque is very small, the resulting signal-to-noise ratio in the calculated power loss value is poor. In other words, a small value for torque in the denominator giving rise to the power loss value magnifies the effect of any noise present in the acceleration deviation measurements. By requiring expected torque $\tau_i$ to be above the threshold, false alarms resulting from noise are avoided.

When using the previously described torque threshold as the criteria for a valid test, it is possible to choose the torque threshold so as to exclude most rapid closed throttle decelerations while still allowing detection of misfires at engine idle. However, some marginal situations, primarily at high speeds, have been found to give a few false alarms even when that valid test criterion is met.

If desired to further improve the error rate of misfire detection, an alternative embodiment of the invention employs a combination of high speed and low torque in determining a valid test condition in order to improve accuracy in misfire detection and maximize the time when valid tests can be conducted.

According to this alternative embodiment of the invention, the expected size of the noise in the power loss measurement is determined. The variation in the size of the power loss noise results from 1) the variation in the expected torque as previously described, and 2) the variation with engine speed in the noise level present in the acceleration deviation measurements themselves. The uncertainty in the acceleration deviation is due directly to uncertainty in the original acceleration calculations. The noise in the acceleration measurement increases strongly with increasing engine speed. Thus, a loss error is defined according to this alternative embodiment to identify valid test conditions where the loss error equals a constant (k) multiplied by engine rpm squared ($RPM^2$) divided by the calculated expected torque ($\tau_i$). A loss threshold is then selected such that the loss error must be below the loss threshold in order to have a valid test. Specifically, the valid test criterion in this embodiment is as follows:

loss error $= k\ RPM^2/\tau_i$ and loss error $<$ loss threshold where constant k is based on known or impirically derived parameters of the engine position measuring system. In particular, a value for k on the order of 0.1 representing the error present in the position marker for determining crankshaft rotational angle was determined for one particular system. However, at low engine speeds, a very low and unrealistic estimate of the error is predicted (i.e., approaching zero) by the formula provided above. Therefore, the rpm value may be replaced by a constant below an impirically determined engine speed.

Figure 8:
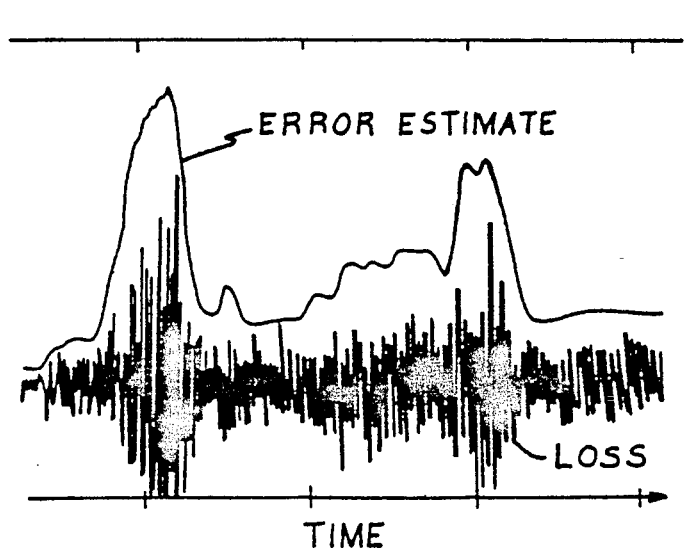
FIG. 8 is a plot of power loss and loss error during a period of transient engine operation.

FIG. 8 plots power loss and loss error each calculated according to this alternative embodiment of the invention. The power loss data was determined on an engine which was known to be free of misfires. The variations in power loss reflect both engine acceleration and deceleration as well as random and speed-dependent noise in the data. The calculated loss error provides a good fit to the envelope of the power loss data derived with no engine misfires. As a result, false alarms can be easily avoided without eliminating testing during conditions which would support an accurate test.

Turning again to FIG. 3, an alternative embodiment of the invention includes a bump sensor 27 connected to acceleration block 17 and discriminator and analyzer 24. The movement of a vehicle over and through road bumps and holes cause load changes that create torque perturbations that might propogate to the engine crankshaft. The torque perturbations alter the time measurements which are the basis for the velocity and acceleration measurements thereby introducing an error into the misfire detection system. A typical vehicle drivetrain has a frequency response which attenuates the torque perturbations at the crankshaft to a level below the perturbations caused by misfires. However, it may be desirable to sense the occurrence of road bump induced load changes by sensing the height of the vehicle suspension using bump sensor 27 and providing a signal to discriminator and analyzer 24 such that no misfire test is made during times of extremely high rate of change of suspension height (since the engine load is then experiencing a transient condition). Alternatively, bump sensor 27 can provide data to acceleration block 17 so that the error introduced into the acceleration measurements can be corrected.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A method for determining, in a multi-cylinder engine, the power produced by a particular firing of a particular cylinder relative to other firings of said cylinders surrounding said particular firing, said method comprising the steps of:

measuring an acceleration value corresponding to said particular firing and each of said other firings;

determining a deviation of said acceleration value of said particular firing from said acceleration values of said other firings;

sensing predetermined engine parameters during operation of said multi-cylinder engine;

determining an expected torque proportional to the torque that would be produced by said particular firing in the absence of any operational faults in said engine from said sensed predetermined parameters; and determining a ratio between said deviation and said expected torque.

* * * * *